US007035802B1

(12) United States Patent
Rigazio et al.

(10) Patent No.: US 7,035,802 B1
(45) Date of Patent: Apr. 25, 2006

(54) RECOGNITION SYSTEM USING LEXICAL TREES

(75) Inventors: Luca Rigazio, Santa Barbara, CA (US); Patrick Nguyen, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 09/628,828

(22) Filed: Jul. 31, 2000

(51) Int. Cl.
*G10L 15/14* (2006.01)

(52) U.S. Cl. ............... 704/256; 704/242; 704/252; 704/243

(58) Field of Classification Search ............. 704/256, 704/242, 252, 243
See application file for complete search history.

(56) References Cited

U.S. PATENT DOCUMENTS

| | | | | |
|---|---|---|---|---|
| 5,884,259 | A * | 3/1999 | Bahl et al. | 704/252 |
| 5,983,180 | A | 11/1999 | Robinson | |
| 6,240,389 | B1 * | 5/2001 | Keiller et al. | 704/243 |
| 6,374,222 | B1 * | 4/2002 | Kao | 704/256 |
| 6,389,416 | B1 * | 5/2002 | Agarwal et al. | 707/6 |
| 6,574,595 | B1 * | 6/2003 | Mitchell et al. | 704/242 |

OTHER PUBLICATIONS

Ney, Hermann; Ortmanns, Stefan; "Progress in Dynamic Programming Search for LVCSR", Automatic speech Recognition and Understanding, 1997. Proceedings., 1997 IEEE Workshop on Santa Barbara, CA., pp. 287-294.

Hermann Ney and Stefan Ortmanns, "Dynamic Programming Search for Continuous Speech Recognition," IEEE Signal Processing Magazine, 1053-5888/99, Sep. 1999, pp. 64-83.

Julian James Odell, "The Use of Context in Large Vocabulary Speech Recognition," Queens' College, Mar. 1995, pp. II-136.

Kris Demuynck, Jacques Duchateau, Dirk Van Compernolle, Patrick Wambacq, "An Efficient Search Space Representation for Large Vocabulary Continuous Speech Recognition," Elsevier, Speech Communication 30 (2000) 37-53, pp. 37-53.

Mosur K. Ravishankar, "Efficient Algorithms for Speech Recognition," May 15, 1996, CMU-CS-96-143, pp. i-132.

Neeraj Deshmukh, Aravind Ganapathiraju, and Joseph Picone, "Hierarchical Search for Large-Vocabulary Conversational Speech Recognition," IEEE Signal Processing Magazine, 1053-5888/99, Sep. 1999, pp. 84-107.

Stefan Ortmanns, Andreas Eiden, Hermann Ney and Norbert Coenen, "Look-Ahead Techniques for Fast Beam Search," Copyright 1997 IEEE, pp. 1783-1786.

* cited by examiner

*Primary Examiner*—David D. Knepper
*Assistant Examiner*—Qi Han
(74) *Attorney, Agent, or Firm*—Harness, Dickey & Pierce, PLC

(57) ABSTRACT

The dynamic programming technique employs a lexical tree that is encoded in computer memory as a flat representation in which the nodes of each generation occupy contiguous memory locations. The traversal algorithm employs a set of traversal rules whereby nodes of a given generation are processed before the parent nodes of that generation. The deepest child generation is processed first and traversal among nodes of each generation proceeds in the same topological direction.

22 Claims, 7 Drawing Sheets

| Node |
| --- |
| int mixture index |
| floats transition probability of self-loop and loop-to-child |
| boolean is_last_child |
| node *first_child_node |
| word end |
| |
| float score |
| node *next_active_node |

FIG. 3

[X]: RANK OF NODES

RECOGNITION SYSTEM USING LEXICAL TREES

BACKGROUND AND SUMMARY OF THE INVENTION

The present invention relates generally to speech recognition systems. More particularly, the invention relates to dynamic programming pattern sequence recognition techniques in isolated word and continuous speech recognition applications.

Dynamic programming techniques are commonly used today for time-warping problems in both isolated and continuous speech recognition and optimum word sequence searching problems in continuous speech (connected word) recognition. A well known type of dynamic programming recognition that can be used in the context of the Hidden Markov Model (HMM) is the Viterbi algorithm. Dynamic programming techniques can also be used with a variety of other types of speech models besides HMMs, such as neural network models, for example.

The classic Viterbi algorithm is an inductive algorithm in which at each instant (each frame) the algorithm stores the best possible state sequence for each of the n states as an intermediate state for the desired observation sequence O. In this way, the algorithm ultimately discovers the best path for each of the n states as the last state for the desired observation sequence. Out of these, the algorithm selects the one with the highest probability. The classic Viterbi algorithm proceeds frame, by frame, seeking to find the best match between a spoken utterance and the previously trained models.

Taking the case of a Hidden Markov Model recognizer as an example, the probability of the observed sequence (the test speaker's utterance) being generated by the model (HMM) is the sum of the probabilities for each possible path through all possible observable sequences. The probability of each path is calculated and the most likely one identified. The Viterbi algorithm calculates the most likely path and remembers the states through which it passes.

The classic Viterbi algorithm is computationally expensive. It keeps extensive linked lists or hash tables to maintain the list of all active hypotheses, or tokens. A great deal of computational energy is expended in the bookkeeping operations of storing and consulting items from these lists or tables.

Because the classic Viterbi algorithm is computationally expensive, it can noticeably slow down the apparent speed of the speech recognizer. This is especially problematic in real-time systems where a prompt response time is needed. The current solution is simply to use more powerful processors—an expensive solution which can be undesirable in some embedded systems and small consumer products, like cellular telephones and home entertainment equipment.

The present invention seeks to improve upon the classical Viterbi algorithm and is thus useful in applications where processing power is limited. In our experiments we have shown that our new technique improves recognition speed by at least a factor of three. The invention employs a unique lexical tree structure with associated searching algorithms that greatly improve performance. While the system is well-suited for embedded applications and consumer products, it can also be deployed in large, high-speed systems for even greater performance improvement. The algorithm can be used for isolated word recognition, or as a first pass fast match for continuous speech recognition. It can also be extended to cross-word modeling.

For a more complete understanding of the invention, its objects and advantages, refer to the following specification and to the accompanying drawings.

BRIEF DESCRIPTION OF THE DRAWINGS

FIG. 3 is a data structure diagram used to represent each node of the lexical tree;

DESCRIPTION OF THE PREFERRED EMBODIMENT

Background

Figure 1:
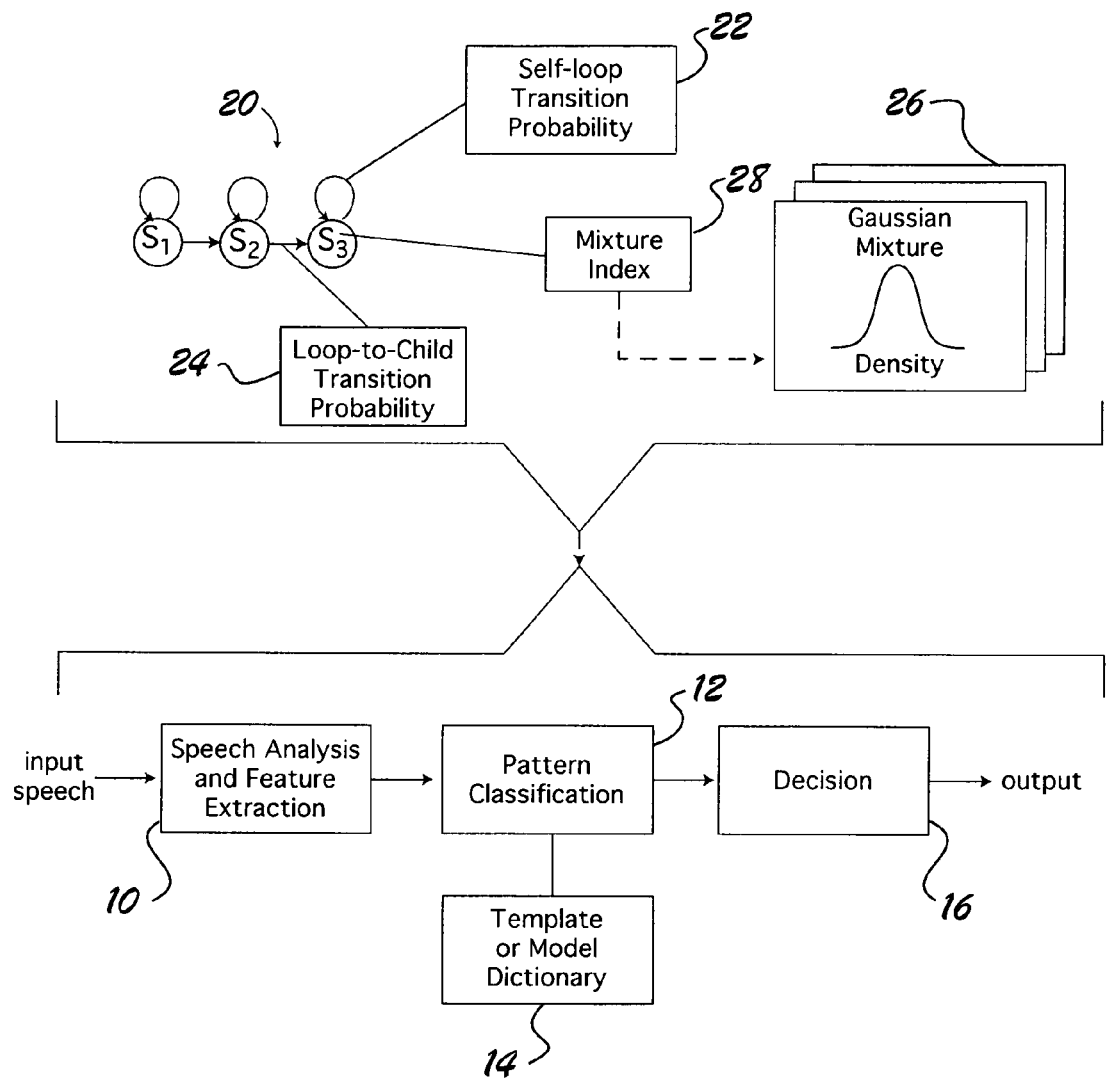
FIG. 1 is a block diagram of a speech recognizer illustrating how a decoder constructed in accordance with the present invention may be used to implement a model-based recognizer.

FIG. 1 illustrates an exemplary speech recognition system. The system operates in two phases: a training phase, during which the system learns the reference patterns representing the different speech sounds (e.g., phrases, words, phones) that constitute the vocabulary of the application; and a recognition phase, during which an unknown input pattern is identified by considering the set of references. During the training phase each reference is learned from spoken examples and stored either in the form of templates obtained by some averaging method (in template-matching systems) or models that characterize the statistical properties of patterns (like in stochastic systems). One of the most popular stochastic systems utilizes a statistical modeling approach employing Hidden Markov Models (HMM).

As illustrated in FIG. 1, the exemplary speech recognizer performs the recognition process in three steps. As depicted at 10, speech analysis and feature extraction is first performed on the input speech. This step focuses on extracting a set of parameters obtained by signal analysis. The next step, depicted at 12, involves pattern classification. It is at this step that the classic Viterbi algorithm would be performed. During this step a similarity measure is computed between the input speech and each reference pattern. The process defines a local measure of closeness between feature vectors and further involves a method for aligning two speech patterns, which may differ in duration and rate of speaking. The pattern classification step uses a template or model dictionary 14 containing the information generated during the training phase. The final step is the decision step 16. During this step the unknown pattern is assigned the label of the "closest" reference pattern. Typically, this decision is based on rules which take into account the results of the similarity measurements.

Because many recognizers in popular use today employ Hidden Markov Models as a model of speech, a simple illustration of a Hidden Markov Model is shown at 20 in FIG. 1. It will be recognized, however, that the principles of the present invention are not limited to recognizers employing Hidden Markov Models. A three-state Hidden Markov Model is illustrated in FIG. 1, with the states designated $s_1$, $s_2$ and $s_3$. Of course, a working implementation could employ a different number of states, and the number of states selected here is merely for illustration purposes. Although the invention is not restricted to LR (left-to-right) HMMs, the algorithm provides best results with this class of models. Hence the HMM illustrated in FIG. 1 is an LR HMM in which state transitions proceed only from left to right, without jumping states.

The Hidden Markov Model involves a collection of probabilities, some associated with the states themselves and others associated with the making a transition from that state to another state or to itself. In FIG. 1, state transitions are illustrated by arrows. Note that some arrows depict a transition from one state to a different state, whereas other arrows depict a transition from one state to itself.

Each phrase, word or phone to be represented by the speech models will have its own model, consisting of probability values associated with each transition and associated with each state. Thus each self-loop has an associated transition probability, depicted at 22; each loop to another state has its associated transition probability 24. In addition, each state has probability information associated with it, as well.

Because the probability values associated with each state may be more complex than a single value could represent, some systems will represent the probabilities associated with each state in terms of a Gaussian distribution. Sometimes, a mixture of multiple distributions are used in a blended manner to comprise Gaussian mixture density data. Such data are shown diagrammatically at 26 and referenced by a mixture index pointer 28. Thus associated with each state is a mixture index pointer, which in turn identifies the Gaussian mixture density information for that state. It, of course, bears repeating that the speech recognizer and Hidden Markov Model structure illustrated in FIG. 1 are intended to be merely exemplary of one type of recognizer with which the invention may be used. In general, the invention may be used with any system that performs dynamic programming in pattern classification. As previously noted, best HMM results are obtained with a LR HMMs. Thus the invention may be employed, for example, in place of the classical Viterbi algorithm.

For more information regarding the basic structure of speech recognition systems and of Hidden Markov Modeling, see Junqua, Jean-Claude and Haton, Jean-Paul, *Robustness in Automatic Speech Recognition, Fundamentals and Applications*, Kluwer Academic Publishers, 1996.

The Preferred Data Structure

Figure 2:
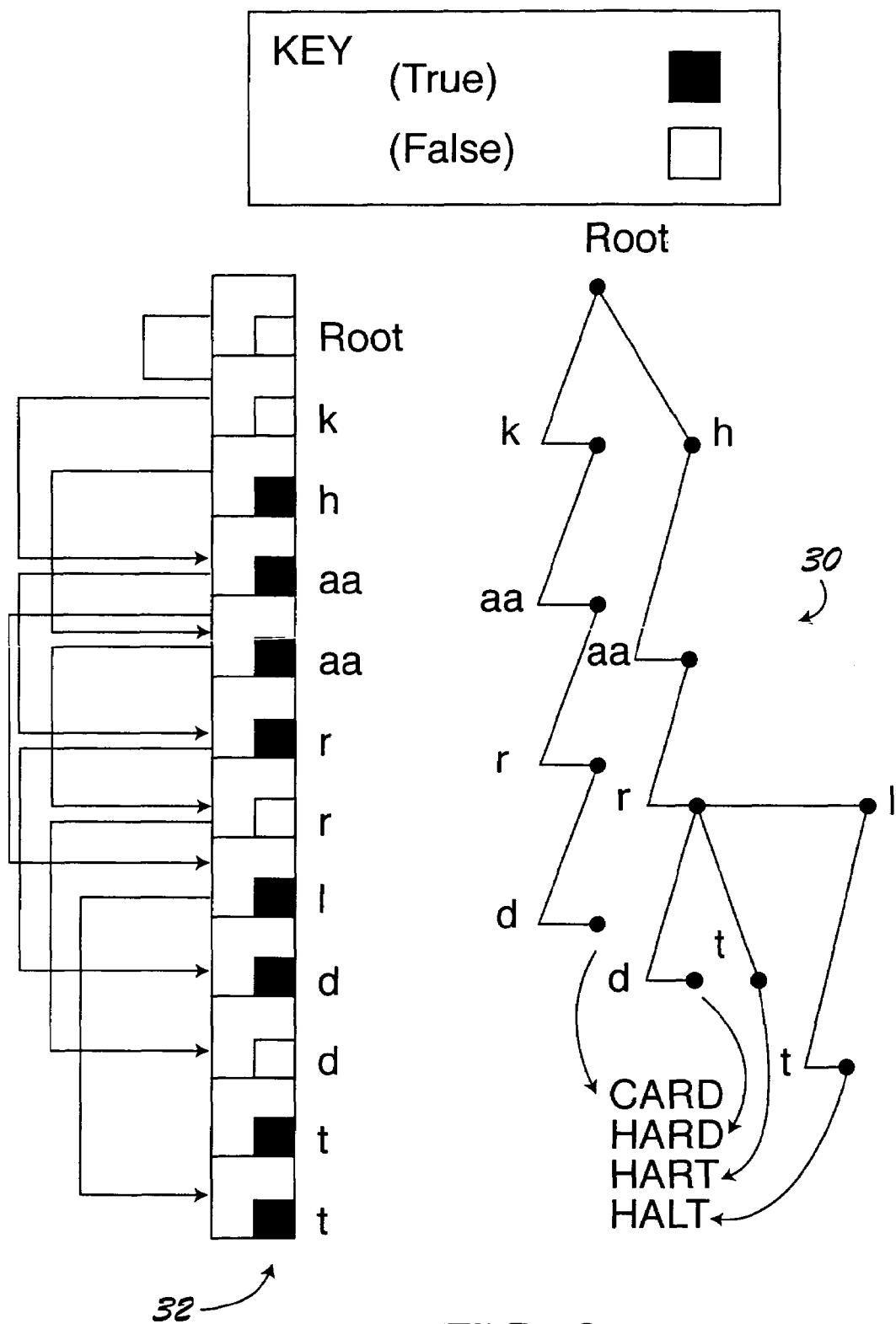
FIG. 2 shows the presently preferred data structure for the lexical tree employed by the invention.

The present invention may be used to greatly improve the way in which the pattern classification step 12 is performed. The invention employs a unique data structure for representing the template or model dictionary 14, in combination with a unique algorithm that traverses the data structure to discover the best matching hypothesis. The preferred data structure will be described in this section; the preferred algorithm will be described in the next section. The preferred data structure represents the template or model dictionary 14 as a lexical tree that has been flattened to a linked list. FIG. 2 illustrates this topology. FIG. 2, more specifically, shows an example of a lexical tree 30 that stores individual words that are made up of letters. The algorithm, described later below, traverses this lexical tree in a time-synchronous fashion and applies dynamic programming equations at each active node. The algorithm thus traverses the tree, from node to node, testing whether or not the letter at each node matches the letter identified in the feature extraction step 10 (FIG. 1).

In considering the exemplary lexical tree presented in FIG. 2, it should be recognized that the illustrated example, which uses words made up of the letters that spell those words, is merely selected here for teaching purposes. In a speech recognition system the features extracted during speech analysis at step 10 might be features or their corresponding sound units such as phonemes, syllables or the like. In other words, the invention is not limited to only applications in which individual letters are tested at each node to identify the word that those letters spell. Rather, any suitable unit may be used at each node. In a continuous speech recognizer, for example, the system might represent entire words at each node, and the lexical trees would contain pointers to entire phrases or sentences made up of those words.

Referring to FIG. 2, note that the lexical tree 30 is represented as a flattened linked list 32 that includes a number of specific features to identify, not only the topology of the list, but also the route that the list would be traversed to mirror a traversal of the corresponding tree. More specifically, the list is constructed so that all nodes at the same descent level within the tree are represented as contiguous entries in the list. Thus the linked list begins with a first structure or node to represent the root node of the tree. Beneath the root node structure are the structures for the next immediate child nodes, corresponding in this example to nodes k and h of the tree. Proceeding with the linked list, the next two nodes in this example represent the second tier children, namely nodes aa and aa of the tree. The next three nodes represent the third tier grandchildren, nodes r, r and l. Finally, the last four nodes represent the last tier of the tree, namely nodes d, d, t and t.

The nodes within the linked list store more than just the letter or sound unit that corresponds to each node in the tree. Each node also includes at least one forward pointer to the next node that would be traversed if one were traversing the tree. Thus the first child node k includes a pointer to the grandchild node aa, to illustrate how one would traverse the tree from node k to node aa in ultimately spelling the sound units corresponding to the word CARD. The structure of each node also includes a flag, represented in FIG. 2 as a small box in the lower right-hand corner. This flag is set to identify if that node represents the last child of its parent. This information is used to further describe the topology of the tree as it is expressed in the flattened linked list form.

The actual representation of the linked list takes the form of a data structure shown in FIG. 3. The structure of FIG. 3 illustrates how the flattened linked list nodes might be configured for a recognizer that uses Hidden Markov Models. The nodes may be readily configured to store other types of parameters, as well. Thus the illustration of FIG. 3 should not be understood as a limitation upon the scope of the invention. The structures can be used to store parameters and/or template information corresponding to recognizers other than Hidden Markov Model recognizers.

Referring to FIG. 3, each node stores the topological structure of the tree as follows. It includes a data element 50 in which is stored the pointer from that node to its next child node. These pointers correspond to those illustrated in FIG. 2 and are used when traversing the tree. The node data structure also includes a Boolean flag 52 that is either set or not set to indicate whether that node is the last child of its parent. This information was illustrated diagrammatically in FIG. 2 by the small boxes that are either unfilled (FALSE) or filled (TRUE).

Because the illustrated example is designed to represent Hidden Markov Models, the node data structure includes data elements 54 that contain the transition probabilities associated with the self-loop and loop to child probabilities associated with that node. In a typical recognizer these would be floating point values corresponding to the probabilities illustrated in FIG. 1 at 22 and 24. The node data structure also includes a data element 56 in which an index or pointer is stored to identify the corresponding Gaussian mixture densities of that node. The mixture index pointer was shown at 28 in FIG. 1. In turn, it points to a collection of data representing the Gaussian mixture density 26 or other probability values used by the recognizer to represent the probability that a given node would emit a given sound unit.

The remaining data elements in the node data structure are used by the algorithm that determines which traversal represents the best path or best match. Data element 58 stores the cumulative probability score associated with that node as the algorithm performs its analysis process. Data element 60 stores a pointer to another node within the tree, known as the next active node. The algorithm uses the next active node to determine how it will proceed through the tree. The details of the algorithm and how these data elements come into play will be described next.

The Algorithm

The preferred algorithm traverses the data structure, described above, in a time-synchronous fashion. That is, the algorithm traverses the nodes in synchronism with the observation data developed as the feature extraction process (step 10 in FIG. 1) proceeds. In a typical recognizer, the input speech is temporally segmented or subdivided into frames. The preferred algorithm thus operates in synchronism with these frames.

Traversal from node to node is dictated by the topological structure of the tree and also by a second structure called the active node envelope. Active nodes are those node that currently represent the most likely match hypotheses. The active node envelope is a linked list of these currently active nodes. The active node envelope represents a dynamic structure. Nodes will join or leave the active node list as the algorithm proceeds. Nodes are added to the active list if their probability score is above a beam search threshold and formerly active nodes are cut from the active list if their score falls below that threshold. To compute the probability score of an active node, the algorithm applies the following dynamic programming equation to each active node:

$$s_k(t) = \max\{s_\phi(t-1) + a_{\phi,k}, s_k(t-1) + a_{k,k}\} + d_k(t)$$

where $s_k(t)$ is the score at time t, and $\phi$ is the node's parent, a node such that $a_{\phi k} \neq -\infty$. Further, $d_k(t)$ is defined to be the emission log probability of the current observation.

To understand how the algorithm traverses the lexical tree, a few definitions should be made. With reference to the lexical tree, we define the depth of the node as the number of states on that node's left. See FIG. 4a. The greater the number, the deeper the node. We define a column of the lexical tree as the set of nodes of the same depth. For each column we define or an arbitrary order relation on the nodes. The active envelope or active node list is the list of nodes that are active, ordered given a relation such that, if node n is a node with parent n*, and node k is a node with parent k*, k*<n* implies k<n. Since all nodes of a given depth in the lexical tree can be processed in almost any arbitrary order, we chose the traversing sequence that maximizes the performance of the memory cache. In other words, when the processor loads a given address from memory, it's onboard cache mechanism will also load a block of contiguous addresses that immediately follow the address being loaded from memory. Thereafter, if any of those subsequent addresses need to be accessed, the processor will access them from its cache, instead of from memory, thereby eliminating the associated memory access time. The present invention traverses the lexical tree so that it exploits this feature of the cache. The lexical tree is encoded so that the algorithm will traverse the tree in a direction that utilizes the information stored in the cache.

To further illustrate, let the nodes of FIG. 2 be ordered in a contiguous array in memory. The preferred embodiment will thus traverse the nodes in increasing order of the memory heap. The preferred traversal path is illustrated in FIG. 4b. Traversal starts at the active node of greatest depth and then proceeds in increasing order within a given column. Once all active nodes within a column have been traversed, the path proceeds to the previous column.

The presently preferred algorithm proceeds through the following steps:

1. Start from the deepest active list in the lexical tree.
2. Let B be the smallest ranked node in the active list of the children column.
3. Traverse the active list in increasing order.
4. For each child c of the current node k,
5. If B<c, then increment B until that condition is false.
6. If B=c, then apply the dynamic programming equation.
7. If B>c, then simply link c before n.
8. Decrement the depth and process the parent column.

*n: the lowest rank active node in a given level. In FIG. 4b, it would be respectively the node pointed to by arrows numbered 0, 2, 4, 6, and 7.

*c: denotes a child on current node k. For instance, in FIG. 4b, node [H]'s only child would be [AA]. This node's children would be [R] and [L]. The "c" would assume the values "R" and "L" (in that order).

*k: the current node in the active list. In the FIG. 4b, it assumes all nodes pointed to by arrows 0, 1, 2, etc, successively.

The above algorithm compares the sequential output of the speech analysis module with the entries in its lexical tree, at each node determining which entry has the highest probability of matching the input speech utterance. While it is possible to exhaustively analyze each node of the tree, this brute force approach is very time-consuming and inefficient. The preferred algorithm dynamically reduces its search space at each successive iteration by identifying the nodes that currently have the highest probability of matching the input utterance. The algorithm identifies these nodes as the next active nodes. It uses these nodes, and only these nodes, in its subsequent iteration.

As the algorithm visits each node, it computes the probability score of that node. If we define the loop and incoming probabilities as $l_k = a_{k,k}$ and $i_k = a_{k^*,k}$. The score $S_k(\bullet)$ at time t+1 can be computed as:

$$S_k(t+1) = \max\{s_k(t) + l_k, s_{k^*}(t) + i_k\} + d_k(t).$$

Note that the algorithm uses t and t+1 instead of t and t−1 to denote a forward recursion instead of a backwards recursion. The ultimate goal is to compute a score based on knowledge of child notes only (i.e., from k* and not from k) to avoid use of back-pointers (i.e., knowledge of the parent node).

The algorithm defines the topological score $r_k(t) = s_k(t) - d_k(t)$ and the partial topological score $\hat{r}(t) = s_k(t) + 1$. Note that the partial topological score equals the topological score when k* does not belong to an active list. The algorithm traverses a cell in the active envelope by performing the following operations:
1. Compute score $s_k \leftarrow r_k + d_k$ (acoustic match);
2. Bequeathal: for each child c, $$r_c \leftarrow \max\{s_k + i_c, r_c\}.$$

The score field of the child is assumed to hold the partial score $\hat{r}$.
3. Self-activation:

$$r_k \leftarrow \hat{r_k} = r_k + l_k.$$

The score field now holds the partial topological score. If no score inheritance takes place then this is also the topological score for t+1.

As indicated by the above steps, each cell k computes its own topological score and acoustic scores at each frame. We call this property self-activiation. Each cell activates itself and then all of its children. If the children have already activated themselves, the parent cell's score is bequeathed to its children. Bequeathal and self-activation can be inverted if the algorithm keeps $s_k$ and the next active node in variables. In such case data from a node can be discarded from the memory cache immediately after self-activation. Note that during the bequeathal process a node has direct access to its children. This is ensured by the way the active envelope is constructed, as described above.

Dynamic Behavior of Algorithm and Active Node Envelope Propagation

As noted above, the active node envelope is a dynamic structure. The active nodes change as the algorithm proceeds. When the active node envelope is superimposed onto the lexical tree, the active node envelope will appear to propagate as the algorithm operates over time. This concept is shown diagrammatically in FIG. 4a.

Figure 4A:
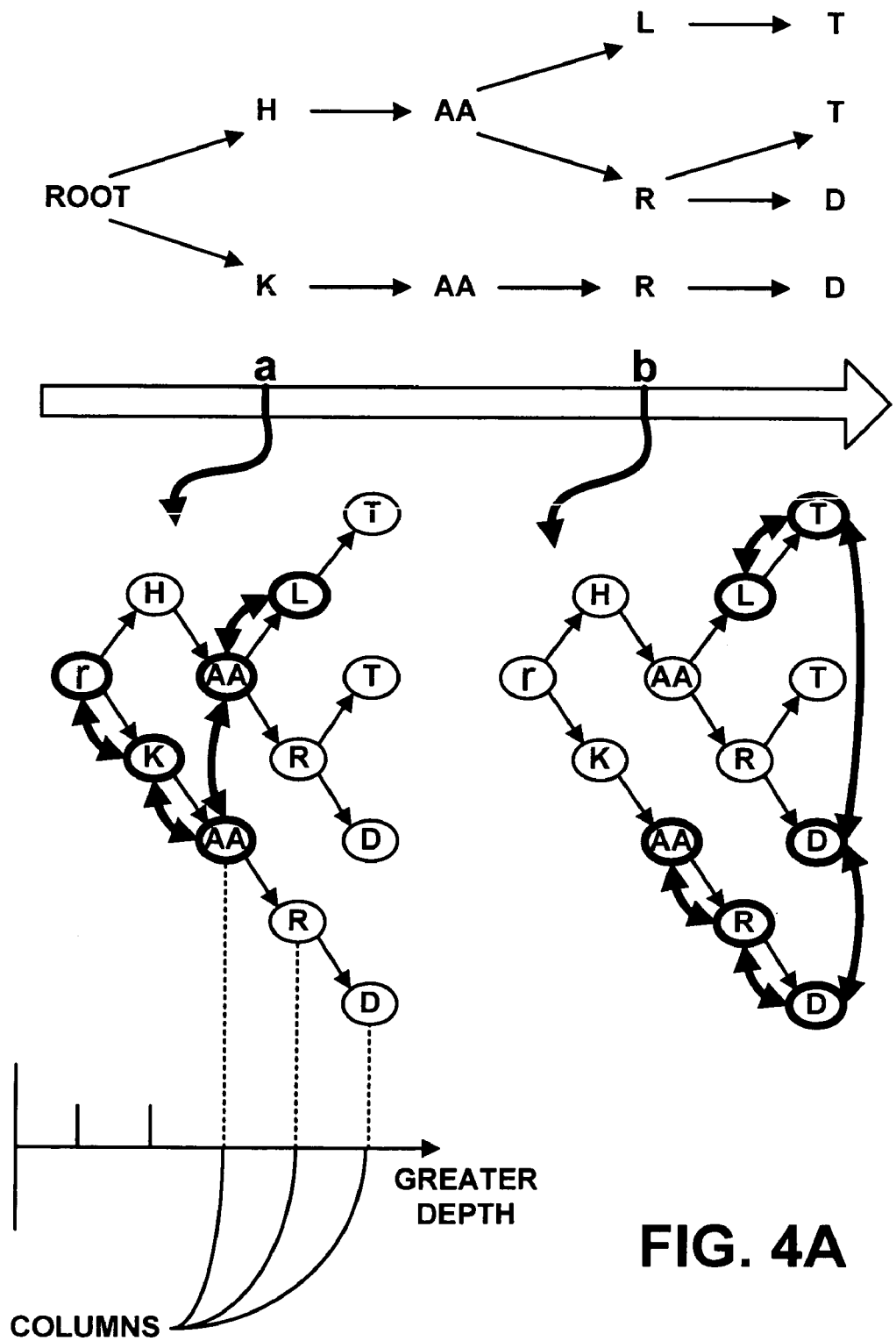
FIG. 4a is a timeline diagram illustrating the basic task performed by a decoder employing the invention in a continuous speech application.
Figure 4B:
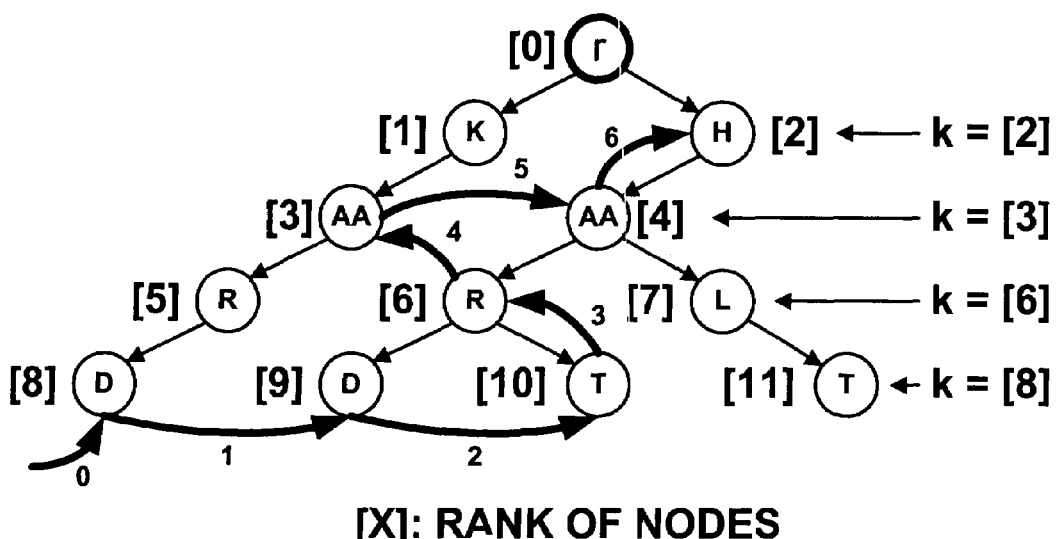
FIG. 4b is a tree diagram, showing how the active envelope is traversed.

FIG. 4a shows an example where words, instead of letters, are represented at each node. In the preceding examples, an individual word recognizer was illustrated. Each node of the tree represented a letter or sound unit that comprises a word in the dictionary. However, it will be recalled that the techniques of the invention can be used in both individual word and continuous speech recognizers. Thus FIG. 4a shows how the tree structure might look in a continuous speech recognizer, in which individual sound units are represented at each node and the output would be words. By examining the tree 70 in FIG. 4a one can see, for example, how the word "card" would be constructed by appropriate traversal of the tree.

FIG. 4a shows how the active node envelope will appear to propagate over time. Timeline 72 shows how the next active node envelope for the exemplary tree might appear at a first time a, and at a later time b. Time a corresponds to the point within the utterance "card" immediately after the sound unit "k" has been analyzed by the speech analysis step 10 (FIG. 1). Time b corresponds to the point at which the sound "r" has been processed. At time a the active envelope is illustrated at 74, correspond to those that are most likely to match the utterance that has been partially analyzed at this point. At later time b the active envelope has propagated outwardly, as illustrated at 76. The active node envelopes at 74 and at 76 represent the active nodes at two different points in time (time a and time b). The algorithm operates upon these active nodes, using the currently active nodes to define the entry point into the lexical tree for the next successive iteration.

As illustrated by this example, the next active nodes evolve or propagate, much as a wavefront would propagate if a stone were dropped into a puddle of water at the root node, causing a wave to propagate outwardly with the passage of time. In a single word recognizer, the next active node wavefront would, indeed, propagate in such an outward, wavelike fashion. That is because each individual node need only be used once. In the more general case, however, such as in a continuous speech recognizer, nodes may be visited again and hence the next active node wavefront would not necessarily always propagate away from the root node. To understand why this is so, appreciate that in a continuous speech recognizer the speaker may utter a word more than once. Thus the utterance "the quick brown quick brown fox" would cause the next active node wavefront to momentarily propagate toward the root node.

Figure 5:
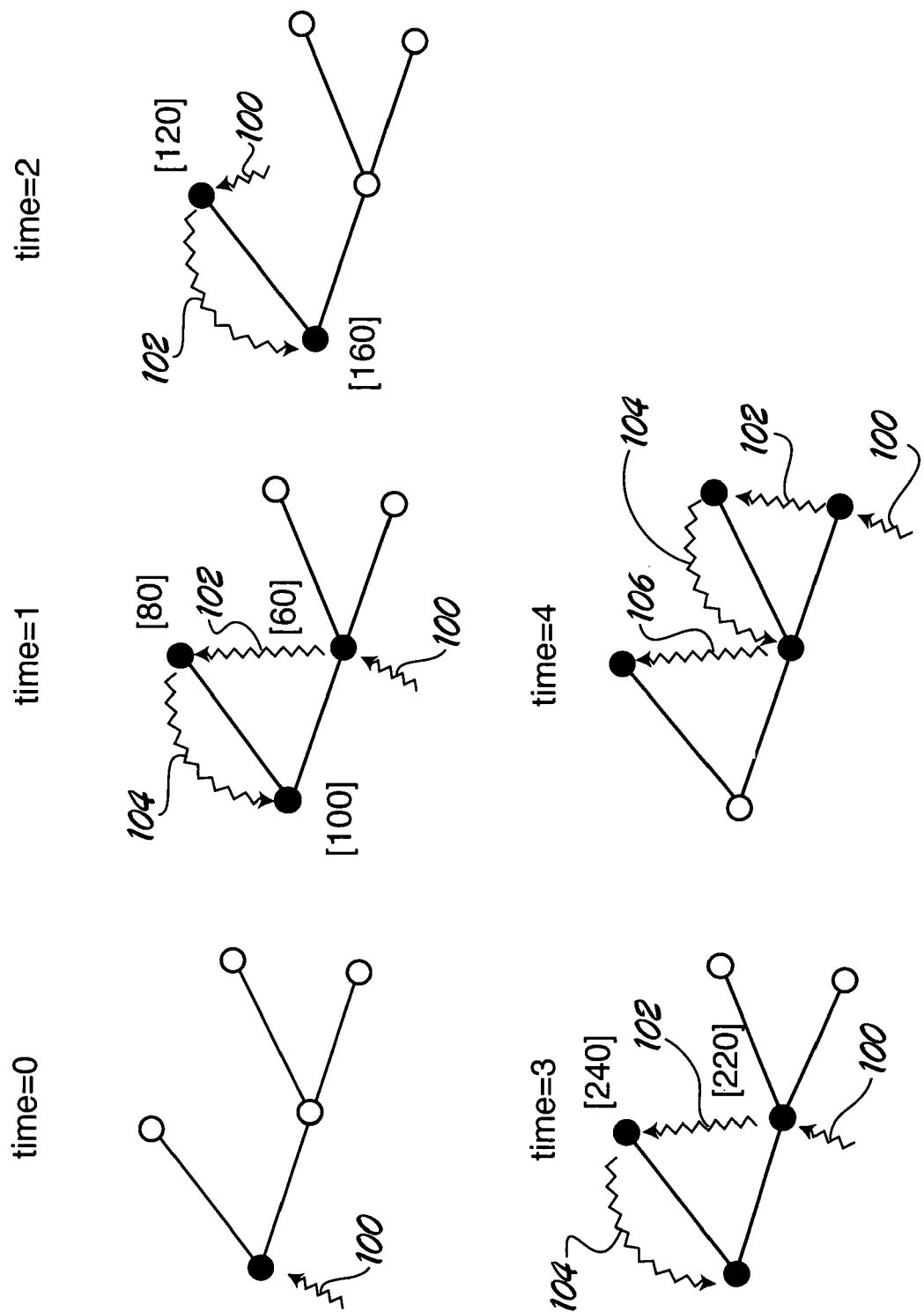
FIG. 5 is a series of tree diagrams useful in understanding the dynamic behavior of the algorithm.

FIG. 5 shows the dynamic behavior of the presently preferred search algorithm. Specifically FIG. 5 shows a subset of the lexical tree at different times: time=0, time=1 . . . time=4. In a frame-based recognizer these different times would correspond to successive frames. The algorithm begins at the root node at time=0 as indicated by the active entry point arrow 100. At time=0 the root node is the only active node. The algorithm then proceeds to identify the child nodes of the root node and these also become active nodes at time=1. The algorithm uses the active envelope traversal path to visit one active node to the next. The path always begins at the deepest nodes, i.e. the ones that are furthest from the root node.

At time=1 the active node entry point is designated by the arrow labeled 100. The active node traversal path then proceeds as indicated by arrows 102 and 104. For purposes of illustration, example probability scores will be used, showing how the individual nodes become active and are then eliminated by the beam search process. At time=1 assume that the root node has a probability score of 100 (all scores are shown in brackets in FIG. 5). Assume further that the other two active nodes have probability scores of 60 and 80, respectively. The algorithm employs a beam search technique using a beam size defined as the maximum deviation from the best score at a given time frame. For purposes of this example, assume that the beam size is 30. The beam search algorithm specifies that a node is deleted from further processing if the probability score of that node is less than the probability score of the highest probability node by more than the beam size. In other words, if the probability score of a node is less than the maximum score minus 30, that node will be skipped in subsequent processing.

At time=0 the maximum probability score is the score associated with the root node, namely a probability of 100. The beam is 100–30 or 70. Note that the node with a score of 60 falls below the beam and is thus subject to being cut by the beam search algorithm. Accordingly, at time=2 only two active nodes are present, the root node and the node pointed to by the active node entry arrow 100. Because the probability scores are recomputed at each time interval, new values for each active node are computed. Assume that the root node has a probability score of 160 and the other active node a score of 120. Also note that at time=2 the active node traversal path enters at the arrow designated 100 and proceeds as indicated by the arrow 102.

Calculating the beam at time=2, the algorithm determines that the beam is 160−30=130. Because the node having a probability score of 120 falls below the beam value, it is cut from further processing. Thus only the root node survives the beam cut.

At time=3 the root node remains active, and its child nodes are thereby also activated. Note that in this case, the uppermost child node that was cut by the beam search at time=2 is reactivated at time t=3 because it is a child of the active root node. Also note that the active node entry point 100 identifies the deepest node and that the remaining active node arrows 102 and 104 show how the active node path is connected or defined. In the present example, assume that the root node has a probability score of 200, the entry point node a probability score of 220 and the remaining node a probability score of 240 as illustrated at time=3. The beam calculation 240−30=210 now results in the root node being cut from further processing because it falls below the beam value. Thus at time=4 the root node is no longer active. However, the child nodes associated with the lowermost node are now activated. The entry point 100 moves to the deepest node, which happens to be one of the child nodes from the previously deepest node. Arrow 102, 104 and 106 show how the active node path would be traversed. As in the preceding cases, the entry point is always at the deepest node and the traversal proceeds such that the deepest nodes are traversed first and the traversal path ends with the parent node of the deepest node.

Figure 6:
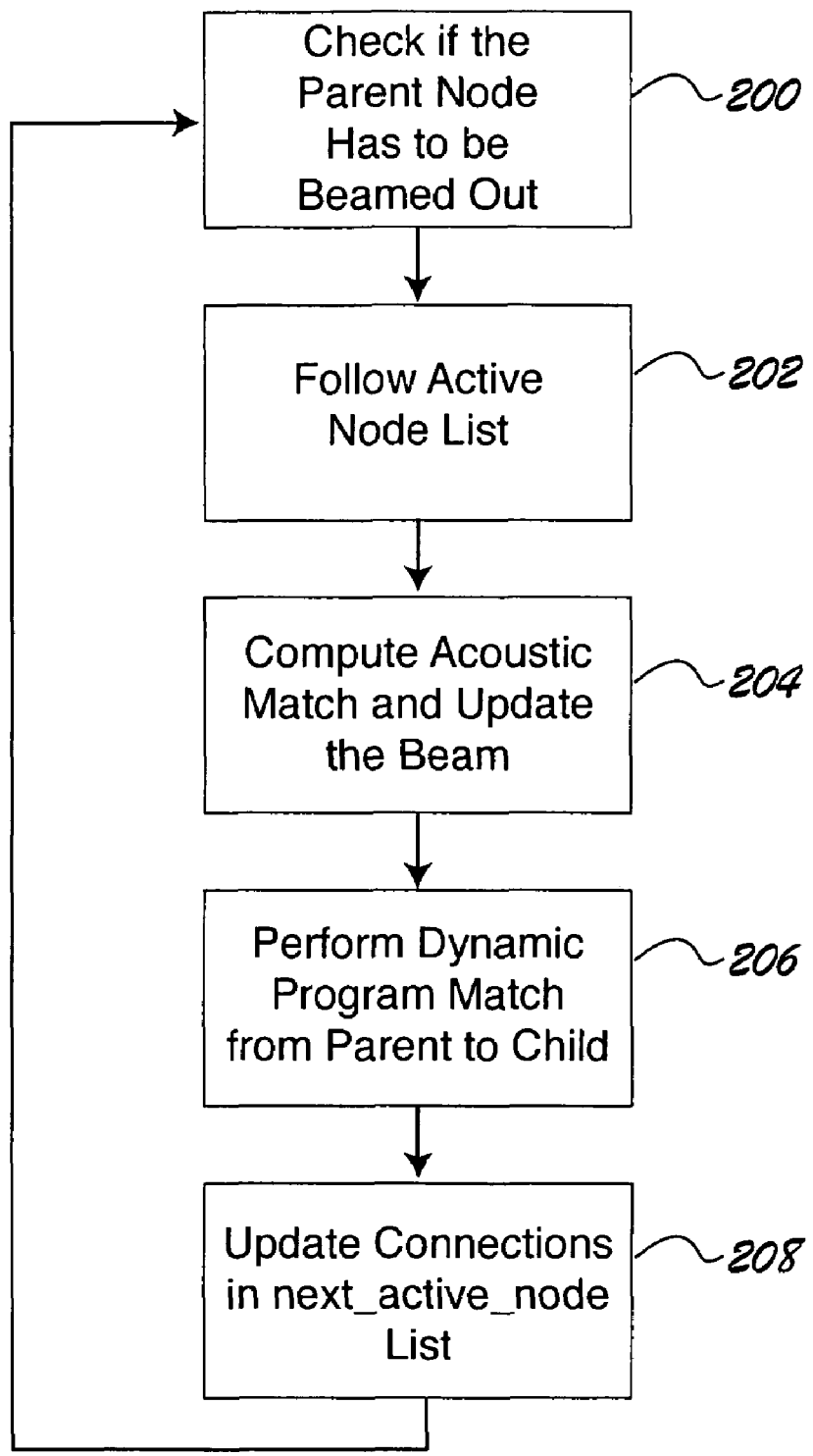
FIG. 6 is a flowchart of the algorithm.

With the foregoing example in mind, the presently preferred algorithm will now be explained with reference to the flowchart of FIG. 6 and to the detailed pseudocode listing appearing in Appendix I. With reference to FIG. 6, the preferred algorithm begins at step 200 by checking to determine if the parent node of the current active node list must be removed from further consideration or "beamed out" by virtue of having a score below the beam score. Next, the active node list is traversed as indicated at 202. The acoustic match is calculated at step 204 and the beam is updated. Next, in step 206 the algorithm performs a dynamic program match from parent to child and at step 208 the connections are updated so that the next active node list can be traversed during time t+1. The procedure then iterates with return to step 200.

The corresponding steps from the flowchart of FIG. 6 had been inserted as heading listings in the pseudocode shown in Appendix I below. Appendix II provides a pseudocode listing for the algorithm used to generate the lexical trees.

In continuous speech recognition, the processor must spend time on computation of the acoustic match, the search algorithm itself, and language modeling. Due to the late application of language model penalties, the search space must be spit. Thus it may no longer be possible to store the hypotheses embedded in the lexical tree. If word-internal context-dependent models are used, however, we need only one instance of the static lexical tree. Furthermore, unigram language models (LM) can be pre-factored. They are useful for unigram or bigram language model look ahead. In addition, a vast number of nodes in the lexical tree will share the same LM look ahead score.

Appendices

Appendix I
```
Foreach level: active_level {
   rho=active_level+1
   k_prev=scratch_node
   ael=entry point of rho (the list at time t)
   for(k=entry point of active_level; k!=tree_end; k=k->next) {
```
Check if the parent node has to be beamed out:
```
      if(r_k<Beam0) {
      r_k=partial score=-infinity
      if(k==entry point of active level)
      entry point of active level=k->next
      /* do not increment k_prev*/
      }
```
Follow active node list:
```
      /* active node */
      k_prev->next=k;
      k_prev=k;
```
Compute acoustic match and update the beam:
```
      /* acoustic match */
      S_k=r_k+d_k
      /* self-activation */
      r_k=partial score=s_k+_k
      beam=max(beam, r_k)
      /* bequeathal */
```
Dynamic programming step from parent to child:
```
      for all children of k: c {
         r_c=max {r_c=partial score, s_k+i_c}
         entry point of rho=min(entry point of rho, c)
         B=max{B, r_c}
```
Keep next_active_node list connected:
```
         switch(c) {
            (c<ael):
               new_ael->next=c; new_ael=c;
            (c==ael):
               ael=ael->next; new_ael->next=c; new_ael=c;
            (c>ael):
               next=ael->next
               new_ael->next=ael
               ael=next
               while(ael<=c) ael=ael->next
               new_ael=c
            }
         }
      }
   new_ael->next=ael;
}
Beam0=beam-beam-width
```

Appendix II
We generate the tree with the following algorithm:
```
leftC :={ {all transcriptions} }
bin :={ {null}^{max_state} }
do {
   more=0;
   Foreach (root) in leftC {
      split root:
         foreach (subtran) in root {
            prepend transcription at bin[subtran.getNextState(
               )]
            if (bin not visited)
               insert bin into lateral list
         }
      collect bins:
         foreach bin in lateral list {
            insert into right column unless end of word
            more :=1
         }
      serialize root into vectree}
```

```
while(more);
    swap left and right columns
}
```

From the foregoing it will be seen that the present invention provides a highly compact and efficient data structure and algorithm for performing dynamic programming matching in speech recognition systems. The algorithm and data structure may be used as a replacement for the classic Viterbi algorithm in a variety of dynamic programming and recognition applications. The lexical tree structure and the active node traversal technique results in a highly memory efficient process that can be used to great advantage in recognition systems that have limited memory and/or processing speed. The invention is therefore useful in embedded systems, consumer products and other recognition applications where large memory and fast processors may not be feasible.

While the invention has been described in its presently preferred embodiments, it will be understood that the invention is capable of modification without departing from the spirit of the invention as set forth in the appended claims.

The invention claimed is:

1. An improvement in a dynamic programming system for speech recognition, comprising:
    a lexical tree data structure implemented in a computer-readable memory accessible by a processor, said lexical tree data structure having a plurality of nodes that topologically define a root node and a plurality of parent-child generations, including a deepest child generation that is topologically furthest from the root;
    a means for processing a traversal algorithm implemented by said processor, said algorithm traversing an active nodes envelope made up of a subset of said nodes based on a set of traversal rules whereby nodes of a given generation of said active nodes envelope are processed before any parent nodes of said given generation are processed, a deepest child generation of said active nodes envelope is processed first, and traversal among nodes of each generation of said active nodes envelope proceeds in the same topological direction, wherein said traversal algorithm includes a dynamic programming process that assigns probability scores to nodes based on knowledge of their respective child nodes in order to propagate the active nodes envelope in said lexical tree data structure; and
    a mechanism for designating selected ones of said nodes as active nodes of said active nodes envelope, wherein said active nodes have a probability score above a pre-determined search threshold.

2. The improvement of claim 1 wherein said tree data structure is encoded in said memory as a flat representation in which nodes of each generation occupy contiguous memory locations.

3. The improvement of claim 1 wherein said tree data structure is encoded in said memory with parent-child generations being represented through linked list.

4. The improvement of claim 1 wherein said tree data structure is encoded in said memory as a flat representation in which nodes of each generation occupy contiguous memory locations and have indicia designating the topological boundary between children of the same parent.

5. The improvement of claim 1 wherein said mechanism for designating selected ones of said nodes as active nodes comprises an active envelope data structure associated with said tree data structure.

6. The improvement of claim 1 wherein said mechanism for designating selected ones of said nodes as active nodes comprises an active envelope data structure associated with said tree data structure.

7. The improvement of claim 1 further comprising a mechanism for designating selected ones of said nodes as active nodes and wherein said traversal algorithm includes a traversal rule whereby only active nodes are processed.

8. The improvement of claim 1 wherein said tree data structure is a lexical tree representing a lexicon.

9. The improvement of claim 1, whrerein propagatin of said active nodes envelope occurs in a forward direction of said tree structure, from the root of the tree structure toward the deepest child generation of the tree structure, as a result of traversal of said active nodes envelope in a backwards direction, from the deepest child generation of said active nodes envelope toward the root of said active nodes envelope.

10. The improvement of claim 9, wherein propagation of said active nodes envelope also occurs in a backwad direction of said tree structure, from the deepest child generation of the tree structure toward the root of the tree structure, as a result of traversal of said active nodes envelope in a backwards diretion, from the deepest child generation of said active nodes evelope in a backwards direction, from the deepest child generation of said active nodes envelope toward the root of said active nodes envelope.

11. An improvement in a dynamic programming system for speech recognition comprising:
    a lexical data structure implemented in a computer-readable member accessible by a processor, said lexical tree data structure having plurality of nodes, including a root node, child generation nodes and parent generation nodes;
    a mechanism for designating selected ones of said nodes as active nodes, wherein said mechanism for designating selected ones of said nodes as active nodes defines an active envelope and uses a set of rules to propagate the active envelope, wherein said active nodes have a probability score above a pre-determined search threshold, said probability score being determined from information sourced only from the child generation nodes; and
    a means for processing a traversal algorithm implemented by said processor, said algorithm traversing said nodes based on a set of traversal rules whereby only said active nodes that are determined as having a probability score above the pre-determined search threshold are traversed, wherein said traversal algorithm includes a dynamic programming process that traverses said active nodes envelope in a backwards direction, from the deepest child generation of said active nodes envelope toward the root of said active nodes envelope, and assigns probability scores to nodes in order to propagate the active nodes envelope in the lexical tree data structure.

12. The improvement of claim 11 wherein said mechanism for designating selected ones of said nodes as active nodes comprises an active envelope data structure associated with said tree data structure.

13. The improvement of claim 11 wherein said traversal algorithm includes a dynamic programming process that assigns a likelihood score to nodes that are traversed.

14. The improvement of claim 13 wherein said mechanism for designating selected ones of said nodes uses said likelihood score to designate said active nodes.

15. The improvement of claim 11 wherein said traversal algorithm includes a dynamic programming process that assigns a likelihood score to nodes that are traversed and wherein nodes are designated as active nodes if heir likelihood score is above a predetermined threshold.

16. The improvement of claim 15 wherein said predetermined threshold is calculated based on the highest likelihood score.

17. The improvement of claim 11 wherein said mechanism for designating selected ones of said nodes as active node uses said set of rules to propagate the active envelope by removing nodes that have a likelihood score below a predetermined threshold.

18. The improvement of claim 11 wherein said mechanism for designating selected ones of said nodes as active nodes, and uses said set of rules to propagate the active envelope by inserting nodes that have a likelihood score above a predetermined threshold.

19. The improvement of claim 18 wherein said set of rules for inserting nodes guarantees that the nodes in said active envelope are sorted by their topological index.

20. The improvement of claim 11 wherein said processor employs a cache and wherein said tree data structure is encoded in said memory such that traversal of said tree proceeds into said cache.

21. The improvement of claim 11, wherein propagation of said active nodes envelope occurs in a forward direction of said tree structure, from the root of the tree structure toward the deepest child generation of the tree structure.

22. The improvement of claim 21, wherein propagation of said active nodes envelope also occurs in a backward direction of said tree structure, from the deepest child generation of the tree structure toward the root of the tree structure.

* * * * *

UNITED STATES PATENT AND TRADEMARK OFFICE
CERTIFICATE OF CORRECTION

PATENT NO. : 7,035,802 B1
APPLICATION NO. : 09/628828
DATED : April 25, 2006
INVENTOR(S) : Luca Rigazio et al.

It is certified that error appears in the above-identified patent and that said Letters Patent is hereby corrected as shown below:

Col. 12, Line 1, Claim 6:
  Delete Claim 6. It is a duplicate of Claim 5.

Col. 12, Line 5, Claim 7:
  Renumber as Claim 6

Col. 12, Line 9, Claim 8:
  Renumber as Claim 7

Col. 12, Line 11, Insert Claim 8:
  Insert --The improvement of Claim 1 wherein said tree data structure is a lexical tree representing the lexicon of a speech recognizer.--

Col. 12, Line 11, Claim 9:
  "whrerein" should be --wherein--

Col. 12, Line 20, Claim 10:
  "backwad" should be --backward--

Col. 12, Lines 24 and 25, Claim 10:
  Delete "backwards diretion, from the deepest child generation of said active nodes evelope in a"

Col. 12, Line 30, Claim 11:
  After "lexical", insert --tree--

Col. 12, Line 31, Claim 11:
  "member" should be --memory--

Col. 13, Line 4, Claim 15:
  "heir" should be --their--

UNITED STATES PATENT AND TRADEMARK OFFICE
CERTIFICATE OF CORRECTION

PATENT NO. : 7,035,802 B1
APPLICATION NO. : 09/628828
DATED : April 25, 2006
INVENTOR(S) : Luca Rigazio et al.

It is certified that error appears in the above-identified patent and that said Letters Patent is hereby corrected as shown below:

Col. 13, Line 11, Claim 17:
"node" should be --nodes--

Signed and Sealed this

Thirtieth Day of October, 2007

JON W. DUDAS
*Director of the United States Patent and Trademark Office*